US011928122B2

(12) United States Patent
Traynham et al.

(10) Patent No.: US 11,928,122 B2
(45) Date of Patent: Mar. 12, 2024

(54) SYSTEMS AND METHODS FOR CREATING QUERY RESULTS DISPLAYS

(71) Applicant: Rovi Guides, Inc., San Jose, CA (US)

(72) Inventors: Matthew Traynham, Raleigh, NC (US); Pratik H. Patel, Raleigh, NC (US); Thomas Becker, Raleigh, NC (US); Bryan Scappini, Cary, NC (US)

(73) Assignee: Rovi Guides, Inc., San Jose, CA (US)

(*) Notice: Subject to any disclaimer, the term of this patent is extended or adjusted under 35 U.S.C. 154(b) by 486 days.

(21) Appl. No.: 16/143,200

(22) Filed: Sep. 26, 2018

(65) Prior Publication Data

US 2020/0082009 A1 Mar. 12, 2020

Related U.S. Application Data

(60) Provisional application No. 62/728,045, filed on Sep. 6, 2018.

(51) Int. Cl.
*G06F 16/248* (2019.01)
*G06F 16/2457* (2019.01)

(52) U.S. Cl.
CPC ...... *G06F 16/248* (2019.01); *G06F 16/24578* (2019.01)

(58) Field of Classification Search
CPC .................................................. G06F 16/248
USPC ....................................................... 707/723
See application file for complete search history.

(56) References Cited

U.S. PATENT DOCUMENTS

| 5,675,752 | A | 10/1997 | Scott et al. |
| 7,761,892 | B2 | 7/2010 | Ellis et al. |
| 8,042,132 | B2 | 10/2011 | Carney et al. |
| 10,402,419 | B1* | 9/2019 | Rubinstein ........ G06F 16/90328 |
| 10,409,865 | B2* | 9/2019 | Taylor ................... G06F 16/951 |
| 11,080,323 | B2* | 8/2021 | Shin ..................... G06F 16/3325 |
| 2007/0192293 | A1* | 8/2007 | Swen .................... G06F 16/338 |
| 2008/0033970 | A1* | 2/2008 | Jones ................... G06F 16/9535 |
| 2009/0006543 | A1* | 1/2009 | Smit .................... G06F 16/9535 |
| | | | 707/E17.108 |
| 2012/0166472 | A1* | 6/2012 | Hoppenot ............. G06F 16/532 |
| | | | 707/769 |
| 2012/0291072 | A1* | 11/2012 | Maddison ........... G06F 16/9032 |
| | | | 725/53 |
| 2014/0040244 | A1* | 2/2014 | Rubinstein ............ G06F 16/248 |
| | | | 707/722 |
| 2014/0188862 | A1* | 7/2014 | Campbell ............. G06F 16/248 |
| | | | 707/728 |
| 2015/0058318 | A1* | 2/2015 | Blackwell ............. G06F 16/248 |
| | | | 707/722 |

(Continued)

Primary Examiner — Van H Oberly
(74) Attorney, Agent, or Firm — Haley Guiliano LLP

(57) ABSTRACT

Systems and methods are disclosed herein for creating query results displays. Parameters for building queries are received from an administrative user (e.g., a designer or operator) or from another source (e.g., another program or a different device). The received queries may be stored in memory for later insertion into a query results display. The system enables one or more queries to be selected to be assigned to a query results display. The selection may also be performed by another application on the same device or be received from another device. When the selection has been received the application may store the assignments to the query results display together with the queries so that, those assignments and the queries can be transmitted to a client device.

22 Claims, 9 Drawing Sheets

(56) References Cited

U.S. PATENT DOCUMENTS

| | | | | |
|---|---|---|---|---|
| 2015/0310526 | A1* | 10/2015 | Warren | G06F 16/248 |
| | | | | 705/26.62 |
| 2015/0356199 | A1* | 12/2015 | Mei | G06F 16/9535 |
| | | | | 707/728 |
| 2018/0024731 | A1* | 1/2018 | Sanches | G06F 3/04817 |
| | | | | 715/763 |
| 2018/0137125 | A1* | 5/2018 | Vittorio | G06F 16/24578 |
| 2019/0065564 | A1* | 2/2019 | Twig | G06F 16/248 |
| 2019/0079934 | A1* | 3/2019 | Liao | G06F 16/248 |
| 2019/0324981 | A1* | 10/2019 | Counts | G06F 16/9537 |
| 2020/0082009 | A1* | 3/2020 | Traynham | G06F 16/248 |
| 2020/0301965 | A1* | 9/2020 | Cormican | G06F 3/0485 |

\* cited by examiner

FIG. 2

Carousels

Automated

🔍 Filter...

New Arrival Stand-Up Comedy Sp...
New Arrival Stand-Up Comedy Specials
Automated - 2 Filters Nolan Movies
Movies by Christoper Nolan
Automated - 1 Filters Redbox Example
Automated - 0 Filters Ron Howard Movies
Movies by Ron Howard
Automated-1 Filters Scorcese Movies
Movies by Martin Scorcese
Automated-2 Filters Sasher Films
Automated-3 Filters

---

Carousel 1  3 Filters

Object Type
Includes
(Movie ⊙)

Release Year
In between...
Lower Value 1990   Upper Value 1998

Personalize Movies
─────○─────

Personalize Scenes
──○────────

Popularity ⊙ ──○──
Ratings ⊙ ────○──
Recency ⊙ ──○────

[Clear All Accounts]

Live Preview

SYSTEMS AND METHODS FOR CREATING QUERY RESULTS DISPLAYS

CROSS REFERENCE TO RELATED APPLICATIONS

This application claims the benefit of U.S. Provisional Patent Application No. 62/728,045, filed Sep. 6, 2018, the disclosure of which is hereby incorporated by reference herein in its entirety.

BACKGROUND

The present disclosure relates to query processing, and more particularly efficient and flexible assignment of queries to results displays.

SUMMARY

Systems and methods are disclosed herein for efficiently creating query results displays. Parameters for building queries are received from an administrative user (e.g., a designer or operator) or from another source (e.g., another program or a different device). The received queries may be stored in memory for later insertion into a query results display. As discussed herein, an application, when active, enables one or more queries to be selected to be assigned to a query results display. For example, an administrative user may select one or more queries to be assigned to the query results display. The selection may also be performed by another application on the same device or be received from another device. When the selection has been received, the application may store the assignments to the query results display together with the queries so that those assignments and the queries can be transmitted to a client device.

Once the client device receives the queries and assignments, the client device may store the queries locally so that when the query results display is invoked, the results of each of the queries can be displayed in an arrangement independently navigable from results of each of the other queries. In some embodiments, the queries and the corresponding assignments may not be sent to the client device until the display is invoked. The query results display may be invoked on a client device when the client device receives an input (e.g., from a user). Upon invocation of the query results display, the client device may display the results of the queries that were assigned to the given query results display. The results of each query may be displayed in an arrangement independently navigable from results of each of the other queries.

The application may include a graphic user interface ("GUI") that enables creation of the queries. The GUI may include a preview feature for a query results display. The preview feature may include different GUI areas (portions of the screen) that will display different information for the preview feature. The first portion of the GUI may include a list of available queries. The available queries may be presented as indicators (e.g., a name of the query as provided by the administrative user upon creation of the query). In some embodiments, in addition to or instead of the indicators, the display includes a preview of search results for each query in the display. The preview of the search results may be displayed in a fashion similar to the display of the results on the client device (e.g., results of each query may be displayed in an arrangement independently navigable from results of other queries).

The GUI of the application may include another area (portion) that will hold the results of the queries that have been selected for a given query results display. The application may take input (e.g., from an administrative user, another application, or another device) to add a query to the given query results display. For example, the application may receive a "drag and drop" command from a user to move the preview of the results of a query from one portion of the display to another. The drag and drop command may include receiving a selection of results of a query in a portion of the display and dragging that selection to another portion of the display that indicates which queries have been added to a given query results display. Based on the input, the application may assign the corresponding query to the given query results display.

In some embodiments, the application may receive an input that includes an instruction to modify an order of results of a query when that query is executed by a client device. For example, the administrative user may create a display where one or more of the queries are to have query results ordered based on popularity or another suitable characteristic or order. That instruction may be stored with its corresponding query and transmitted to the client device.

In some embodiments, the modification of the order of results may be received as an input (e.g., from an administrative user) and indicated in the preview so that the administrative user is able to see the changes that have been made. The application may generate for display a plurality of updatable indicators (e.g., a plurality of sliders), where each indicator corresponds to a given way to modify the order of results. For example, there may be a slider for popularity, personal movies, ratings, recency, and other suitable sliders. The application may receive an update of one of the indicators (e.g., a movement of a slider in a specific direction) indicating an instruction to modify the order of results based on the slider. For example, movement of the popularity slider may be received to indicate that the specific query results should be ordered by popularity. The application may store, based on the update of the slider, an instruction to be executed by a client device when the query results display information is transmitted to the client device. In some embodiments, the preview of the query results on the display of the application may show the results ordered according to the input (e.g., based on popularity, recency, or another suitable input).

In some embodiments, the query results display may enable scrolling through the preview of the results. The application may receive an input to scroll through a preview corresponding to one of the queries. That application may determine that the input instructs scrolling past the last result of the preview and in response scrolling past the last result back to the first result of the preview. For example, a specific preview of the query may include ten results that are ordered based on popularity. If the user scrolls past result number ten, the application scrolls to the first result. It should be noted that this feature is applicable to scrolling on a client device when the query results display is invoked and an end-user scrolls past the last result.

In some embodiments, the application may enable a user to visually build a query. The application may receive (e.g., from an administrative user) criteria for a query. The criteria may be received by generating for display one or more fields that can be used for criteria entry. When the application receives the criteria, a query may be built based on that criteria. For example, the application may receive input into a template for query creation. When the query is created, the query can be executed against the database to create a selectable preview of the results. That selectable preview may be displayed, and upon the selecting of the preview, the query is added to a given query results display.

In order to generate for display the selectable preview, the application may transmit the query to a server (e.g., a remote database server). The server, upon receipt of the query, executes the query against its database and transmits back the results. The device on which the application resides receives, from the server, the results of the query and may generate a preview of the query. It should be noted that in some embodiments, the query results may be stored in memory to be generated for display at a later time.

In some embodiments, the application enables generating different query results displays for different users. For example, if a household has three users, three different query results displays may be applicable to the household (e.g., one for first parent, one for second parent, and one for child). An appropriate query results display may be invoked based on which member of the family is accessing media content. Different query results displays may also be created for different groups of users. For example, all users in New York City may get one query results display, while all users in Boston may get a different query results display.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative interface for creating a query, in accordance with some embodiments of the disclosure;

DETAILED DESCRIPTION

Figure 1:
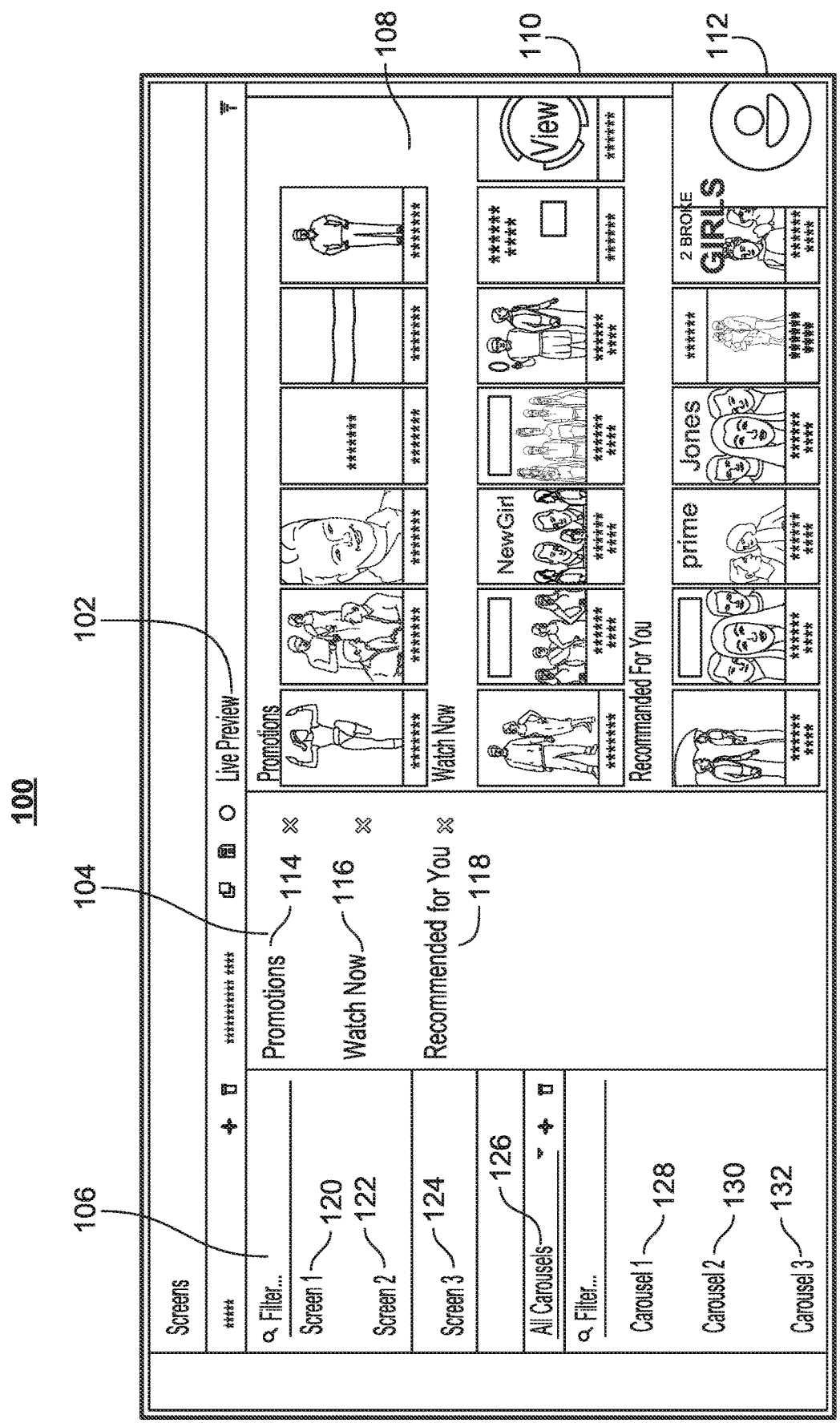
FIG. 1 shows an illustrative interface for creating a query results display, in accordance with some embodiments of the disclosure.

FIG. 1 shows an illustrative interface for creating a query results display, in accordance with some embodiments of the disclosure. Display 100 of FIG. 1 depicts three different areas including a live preview area 102, carousel order area 104, and screen modification area 106. Screen modification area 106 includes two portions. The first portion includes a list of screens that can be modified, as exemplified by screens 120, 122, and 124. The displayed application may receive input (e.g., from a user) selecting one of the screens (e.g., screen 120, screen 122, or screen 124). When input is received, the displayed application may update areas 102 and 104 with data corresponding to the selected screen. The lower portion of screen modification area 106 includes one or more selectable carousels (e.g., carousel 128, carousel 130, and carousel 132). The displayed application may receive a selection of one or more carousels and add the selected carousels to the selected screen. As referred to herein, the term "carousel" refers to a plurality of media asset identifiers selected based on some criteria. For example, a carousel may be created based on a user selecting a plurality of media assets for the carousel. In another example, a carousel may be created based on criteria received from a user. The received criteria may be transformed into a query. The application may transmit a query to a database server (e.g., a server remote to the device on which application is running) and receive in response query results for display.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to here, the term "media asset identifier" refers to an element that identifies a media asset. For example, a media asset identifier may be a string of characters for identifying a media asset. A media asset identifier may be an image or a video that identifies a media asset.

As referred to herein, the phrase "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Upon selection of a carousel in the lower portion of area 106, the application may add an indicator of the carousel into area 104. Area 104 includes all carousels that have been selected to be included in the screen (e.g., Promotions carousel 114, Watch Now carousel 116, and Recommended for You carousel 118). Additionally, area 104 may include an indicator (e.g., an icon) for each added carousel for removing the carousel from the screen. It should be noted that area 104 can include any number of carousels and the carousels shown in area 104 are for illustration purposes only.

Live Preview Area 102 includes strips 108, 110, and 112. Each strip represents media asset that are included in a corresponding carousel. For example, one of the strips may be generated by a query that is executed against a database. Another strip (e.g., Recommended for You 112) may be generated by executing an algorithm for media assets that a user prefers (e.g., based on the user's media asset consumption history). In some embodiments, the application may receive a selection of a carousel from the lower portion of area 106 and add that carousel to area 104. It should be noted that carousels in carousel listing 126 may be filtered so that a selection of a proper carousel can be received.

Figure 2:
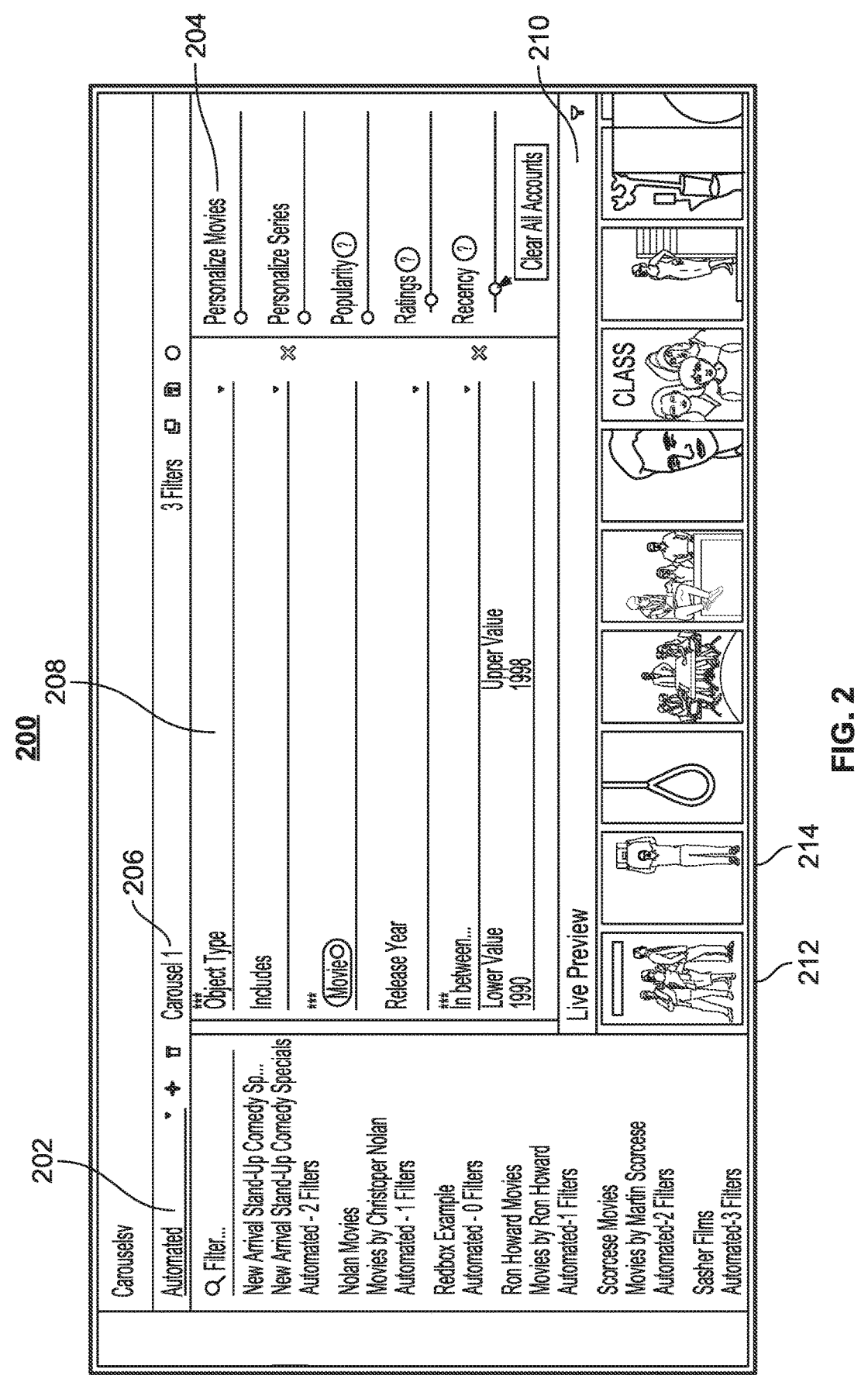

In some embodiments, carousel listing 126 may include an icon that, when selected, invokes a display to build a new carousel. This option may be useful in instances when a carousel that is needed for the display is not available to select. FIG. 2 shows an illustrative interface for creating a query (e.g., a carousel). Carousels of three different types may be created: Editorial, Automatic, and Smart. Editorial carousels require manual selection of media assets to be added to the carousel. Automatic carousels enable receiving an input (e.g., from a user) so that a query can be created for a carousel. Smart carousels involve a selection of an algorithm for creating a carousel or a mix between an editorial carousel and an automatic carousel. Screen 200 of FIG. 2 includes area 202 where the application enables creation of a new carousel or modification of an existing carousel. The existing carousels that can be modified are displayed below the carousel type in area 202. When an input is received to select a carousel modification, the details of that carousel are displayed in area 208. The name of the carousel that is being modified is shown by indicator 206. If a pre-existing carousel is being modified, the application may display carousel options (e.g., query options) that have been received for that carousel. If a new carousel is being created, the options in area 208 may be blank. For example, a carousel may include an object type (e.g., movie, series, or another suitable object type). Another option may include a release year. A carousel may be desired that includes media assets that were released between specific years. It should be noted that next to each option area the application may display an icon to remove that option from the carousel. Other options may be added as well.

FIG. 2 may also include a live preview area 210. As the application receives input defining the carousel (e.g., defining a query), the live preview area 210 may update media asset indicators that are part of the carousel. The live preview area 210 may include media asset identifiers 212 and 214 that correspond to specific media assets. Carousel order area 204 is also displayed in this particular screen. For example, the application may receive input (e.g., from a user) that drags the "recency" indicator in area 204 to the right. Upon receiving the input, the application may adjust the carousel (e.g., the query for the carousel) to put more recent media assets at the front of the carousel. It should be noted that the Live Preview Area 210 may reflect the changes made in the carousel order area 204. Screen 220 of FIG. 2 illustrates that updates in the live preview area based on a change in order area 204. The first two media asset identifiers have changed places, based on the update as illustrated by the order of media asset identifiers 212 and 214 as compared with the order of media asset identifiers 216 and 218. When the carousel has been completed, the application may save the carousel and, in response to an input, display screen 100 of FIG. 1 where a new carousel would be available for assignment to the screen (e.g., query results display).

Figure 3:
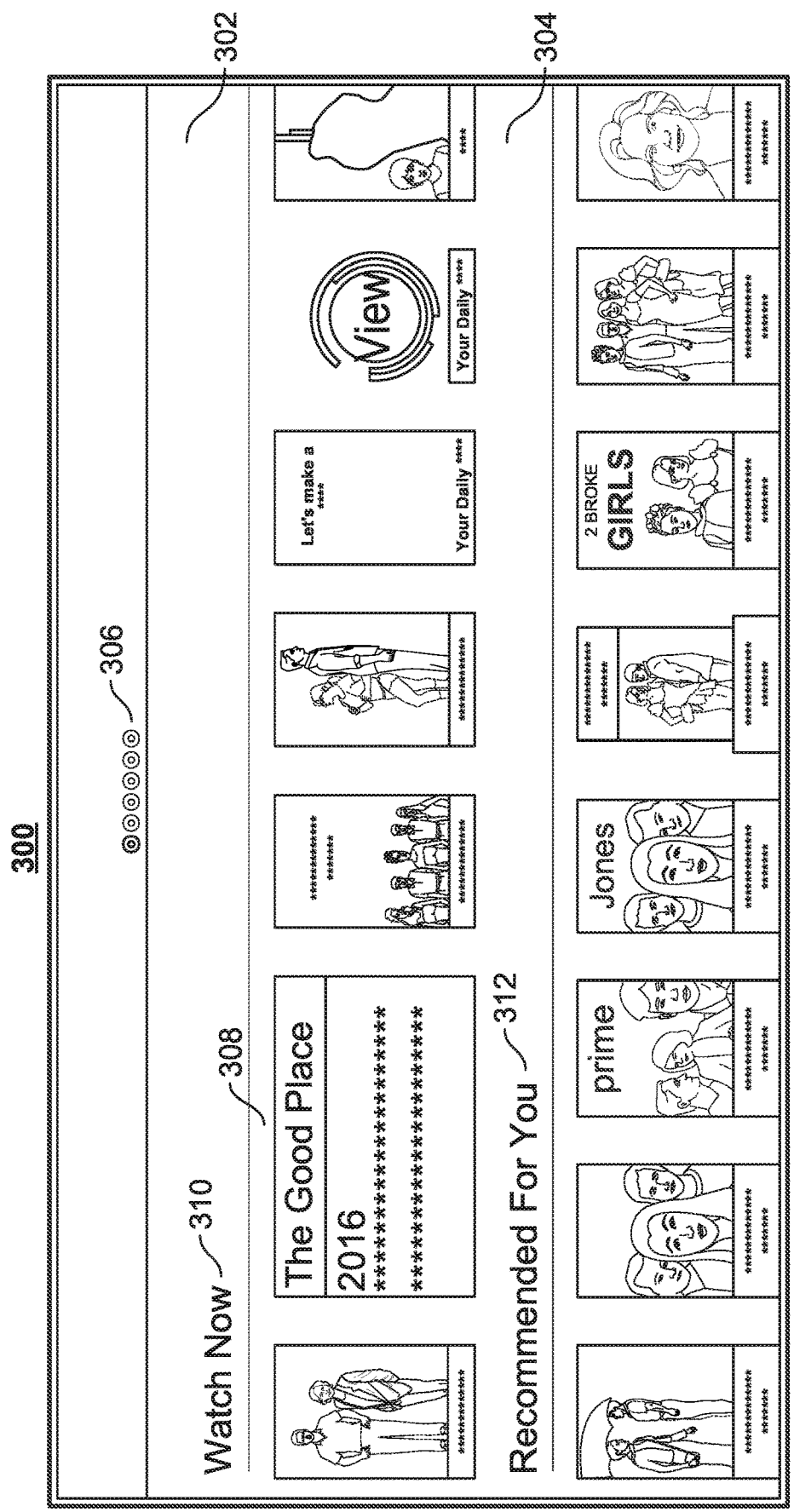
FIG. 3 shows an illustrative display for a query results display presented on a client device, in accordance with some embodiments of the disclosure.

Upon completion of the screen (e.g., a query results display), the application enables saving of the screen. The screen may be transmitted to a client device (e.g., a set-top box, tablet, smartphone, or another suitable device). Screen 300 of FIG. 3 illustrates a screen (e.g., a query results display) that has been received at a client device. Strips 302 and 304 illustrate carousels that have been selected for the screen (e.g., query results display). Each carousel that is displayed may be indicated by a name (e.g., Watch Now 310 and Recommended for You 312). A currently selected media asset identifier may be expanded to give a viewer a better description of the corresponding media asset. Indicator 306 indicates other available screens that the client device is able to generate for display. For example, if the application is given input to create six different screens, those screens can be transmitted to the client device and may be available to a user.

Figure 4:
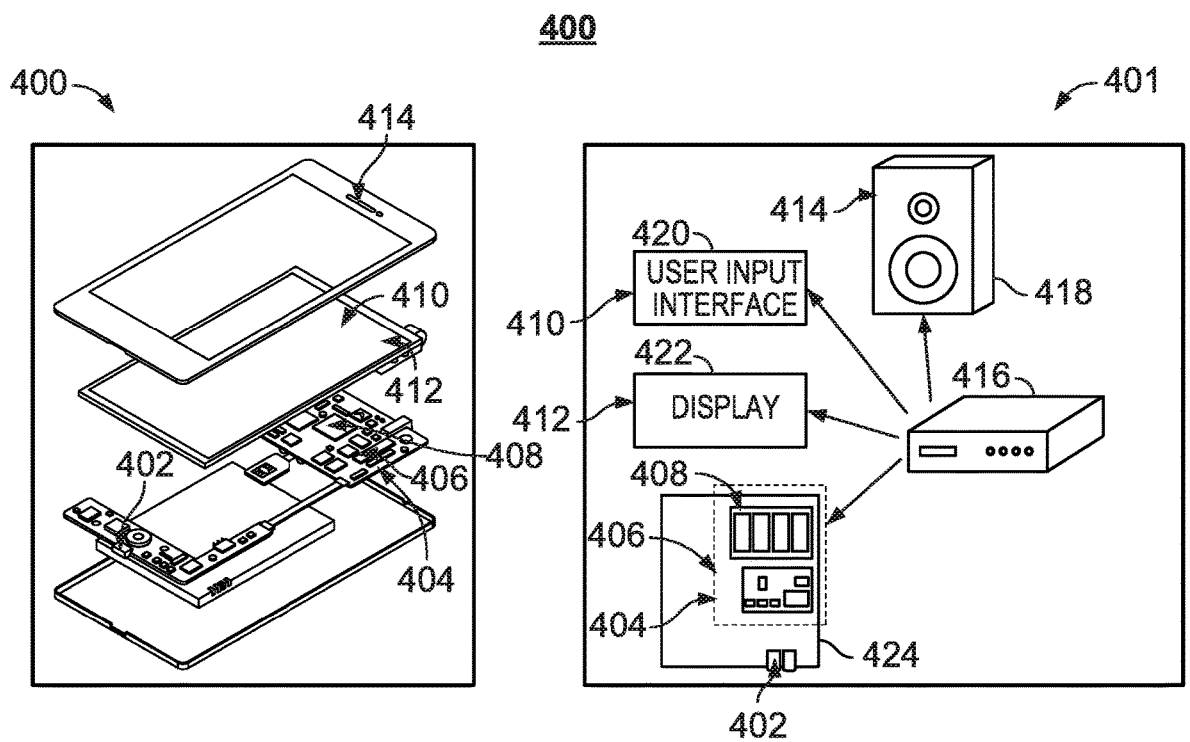
FIG. 4 is a diagram of an illustrative computing device in accordance with some embodiments of the disclosure.
Figure 4:
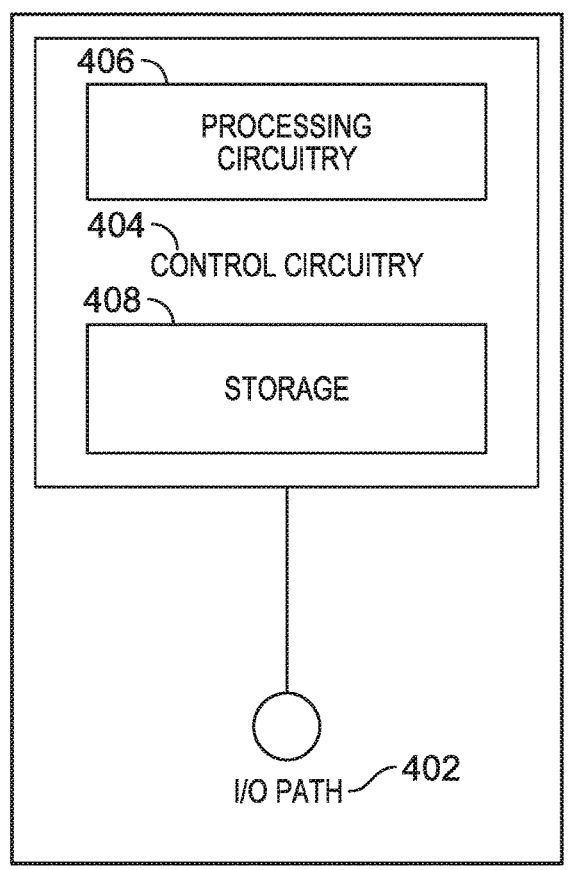

The illustrative graphic user interfaces of FIGS. 1-3 can be displayed using the hardware depicted in FIG. 4. FIG. 3 shows a generalized embodiment of illustrative media devices 400, 401, 402. As depicted, media device 400 may be a smartphone or tablet, whereas media device 401 may be a home media system that includes equipment device 416 (e.g., a set-top box, CPU, video-game console, etc.) powered by processor 424. Media devices 400 and 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry, such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a notification delivery application stored in memory (i.e., storage 408). Specifically, control circuitry 404 may be instructed by the notification delivery application to perform the functions discussed above and below.

In client/server-based embodiments, control circuitry 404 may include communications circuitry suitable for communicating with a notification delivery application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage may be used to supplement storage 408 or instead of storage 408.

Control circuitry 404 may include audio-generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the media device to receive and to display, to play, or to record content. The circuitry described herein, including, for example, the tuning, audio-generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from user equipment 400, the tuning and encoding circuitry (including multiple tuners) may be associated with storage 408.

A user may send instructions to control circuitry 404 using user input interface 410 of media device 400 or user input interface 420 of media device 401. User input interface 410 and user input interface 420 may be any suitable user interface, such as a remote control, mouse, trackball, keypad, keyboard, touch screen, touchpad, stylus input, joystick, voice recognition interface, or other user input interfaces. Display 410 may be a touchscreen or touch-sensitive display. In such circumstances, user input interface 410 may be integrated with or combined with display 412. Display 422 may be provided as a stand-alone device or integrated with other elements of media device 401. Speakers 414 may be provided as integrated with other elements of media device 400. In the case of media device 401, speakers 418 may be stand-alone units (e.g., smart speakers). The audio component of videos and other content displayed on display 422 may be played through speakers 418. In some embodiments, the audio may be distributed to a receiver (not shown), which processes and outputs the audio via speakers 418.

FIG. 4 also includes a server device 440. Server device 440 may also have control circuitry 404 that includes processing circuitry 406, storage 408, and I/O path 402. These components can function in the same manner as described in relation to device 400 and 401.

Figure 5:
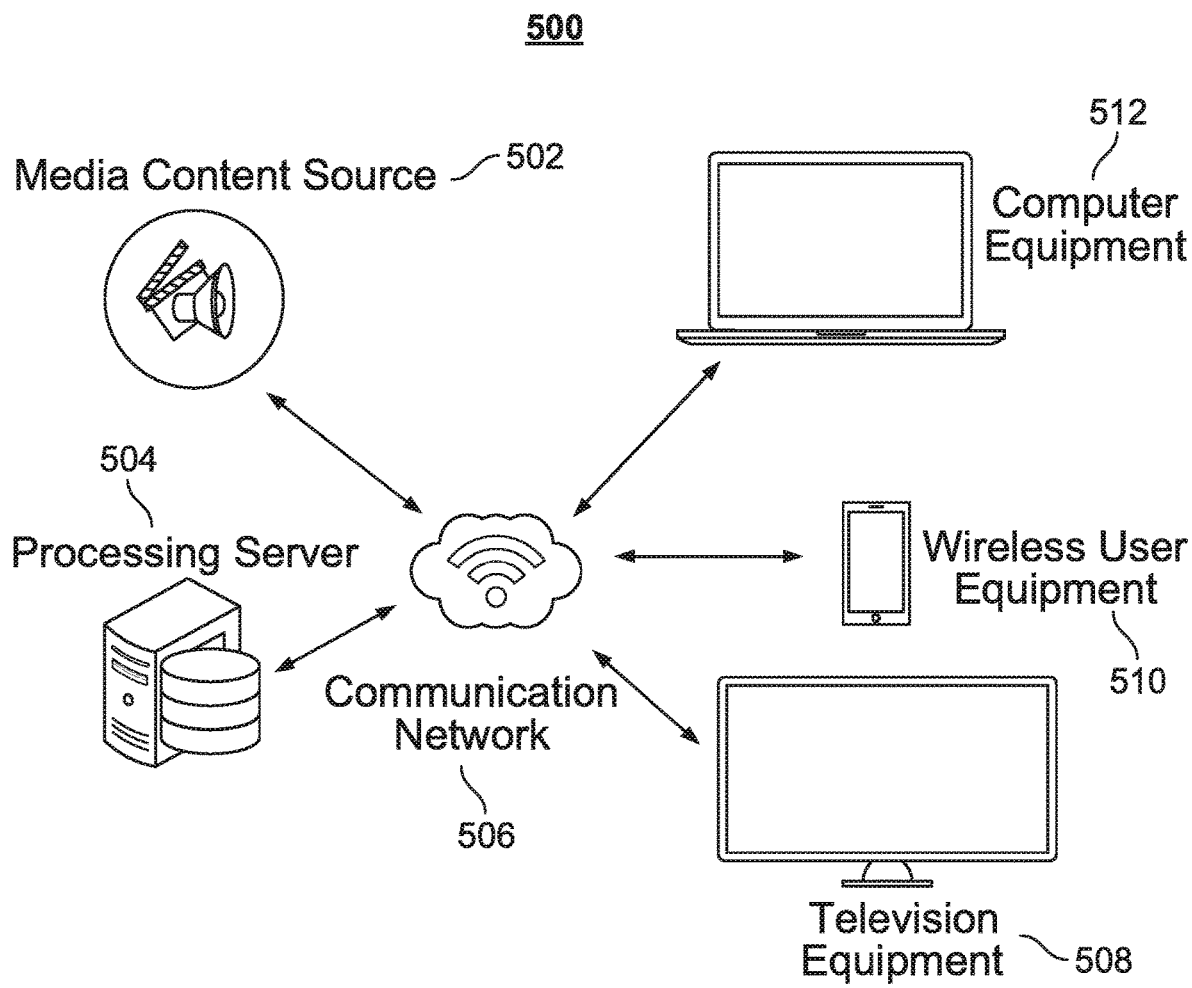
FIG. 5 is a diagram of an illustrative media system in accordance with some embodiments of the disclosure, in accordance with some embodiments of the disclosure.

Devices 400, 401 and 440 can be part of system 500 of FIG. 5 as television equipment 508, computer equipment 512, wireless equipment 510, or any other type of user equipment suitable for accessing content, such as a non-portable gaming machine. For simplicity, these devices may be referred to herein collectively as client devices and may be substantially similar to devices described above.

In system 500, there is typically more than one of each type of client device but only one of each is shown in FIG. 5 to avoid overcomplicating the drawing. In addition, each user may utilize more than one type of client device and also more than one of each type of client device.

The user equipment devices may be coupled to communications network 506. Communications network 506 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communications network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths, but are shown as a single path in FIG. 5 to avoid overcomplicating the drawing.

Although communications paths are not drawn between user equipment devices, these devices may communicate directly with each other via communications paths as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, Inc. The user equipment devices may also communicate with each other directly through an indirect path via communications network 506.

System 500 includes media content source 502 and processing server 504. Communications with the media content source 502 and processing server 504 may be exchanged over one or more communications paths, but are shown as a single path in FIG. 5 to avoid overcomplicating the drawing. In addition, there may be more than one of each of media content source 502 and processing server 504, but only one of each is shown in FIG. 5 to avoid overcomplicating the drawing. If desired, media content source 502 and processing server 504 may be integrated as one source device.

Processing server 504 may retrieve guidance data from media content source 502, process the data as will be described in detail below, and forward the data to the client devices 508, 510, 512. Media content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). Media content source 502 may include cable sources, satellite providers, on-demand providers, Internet providers, over-the-top content providers, or other providers of content. Media content source 502 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 502 may also provide media guidance data that can be used to create carousels and queries as described herein. Media guidance data may be provided to the client devices using any suitable approach. Program schedule data and other guidance data may be provided to the client devices on a television channel sideband, using an in-band digital signal, using an out-of-band digital signal, or by any other suitable data transmission technique.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 206. In such embodiments, user equipment devices may operate in a peer-to-peer manner without communicating with a central server.

Figure 6:
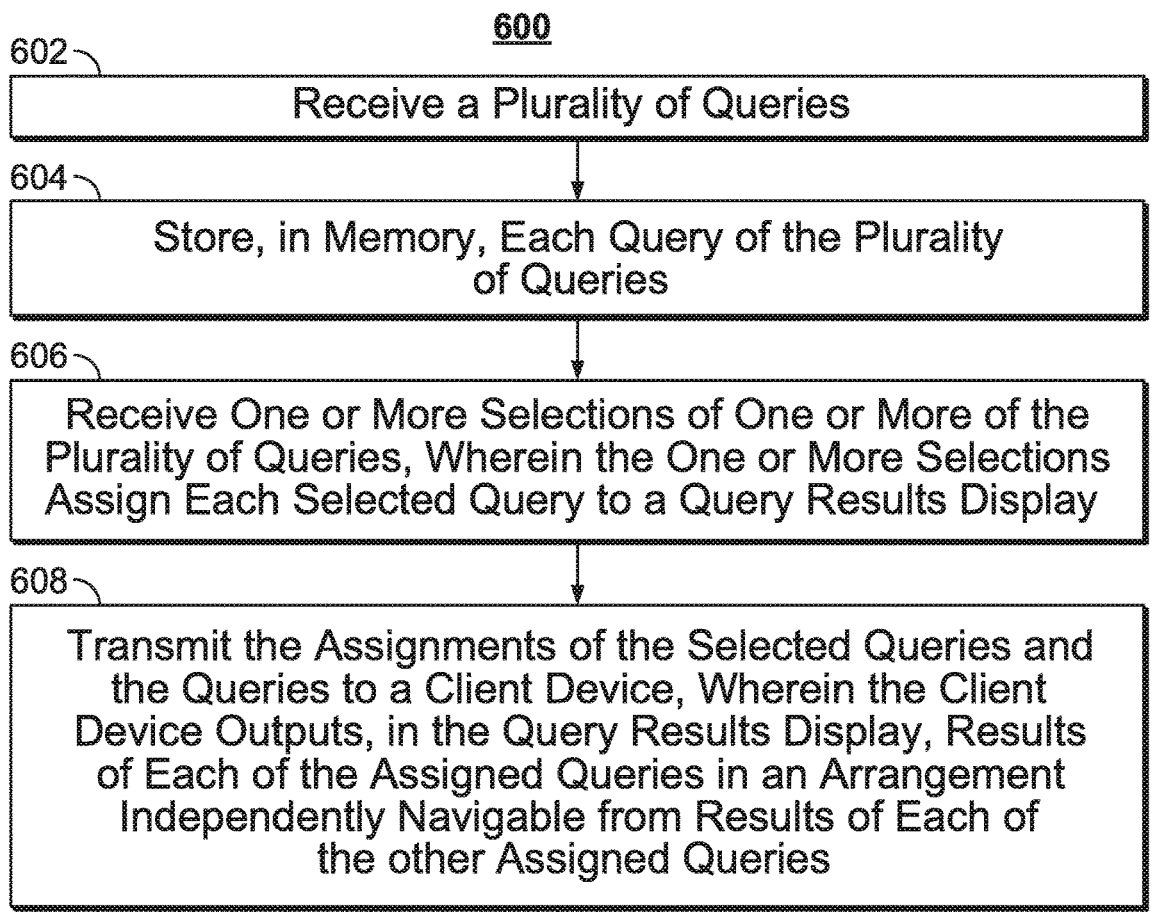
FIG. 6 is a flowchart of an illustrative process for creating a query results display, in accordance with some embodiments of the disclosure.

The systems and devices described in FIGS. 4 and 5 enable not only display of the screens of FIGS. 1-3, but also the execution of processes described in FIGS. 6-10. FIG. 6 is an illustrative process for creating a screen (e.g., a query results display). Process 600 of FIG. 6 exemplifies carousels described in FIGS. 1-3 as queries to be received (e.g., from a user). A screen illustrated in FIG. 1 is exemplified in a query results display. At 602, control circuitry 404 receives a plurality of queries. For example, the control circuitry may receive the plurality of queries from an administrative user. As described in relation to FIG. 1, the control circuitry (e.g., on a client device 512, 510, or 512) may receive a plurality of carousels. In some embodiments, the carousels may be created based on input (e.g., from the user). The input may be received from user input interface 410 or user input interface 420. As discussed in relation to FIG. 2, each carousel may be created based on user input. Each carousel may be stored for later use in a screen (e.g., a query results display). For example, each carousel may be stored on a server in storage 408. A server may be the processing server 504 described in FIG. 5. The carousel (e.g., a query) may be stored in a data structure and transmitted to a client device when an interface for creating a query results display is invoked.

At 604, control circuitry 404 stores, in memory (e.g., storage 408) each query of the plurality of queries. The control circuitry may store each query at local storage 408 on a client device and/or at a remote server (e.g., processing server 504). In some embodiments, the control circuitry stores each query at both storage 408 on a client device and at a remote server (e.g., processing server 504).

At 606, control circuitry 404 receives one or more selections of one or more of the plurality of queries, where the one or more selections assign each selected query to a query results display. For example, as described in relation to FIG. 1, control circuitry 404 may receive an input (e.g., from a user) that drags carousel 128 onto area 104. In some embodiments, the input may indicate a dragging motion to area 102. In response to the input, control circuitry 404 may assign the query to a query results display (e.g., the screen being created in FIG. 1). In some embodiments, the control circuitry may generate a data structure for storing the query results display. The data structure may be stored in storage 408. In some embodiments, the data structure is transmitted to a remote server for storage (e.g., processing server 504).

As discussed in relation to FIG. 1, in some embodiments, when receiving selections of queries for the query results display, control circuitry 404 generates for display in a first portion of a display, a plurality of previews for the plurality of queries. Each preview of the plurality of previews includes an arrangement that is independently navigable. The preview screen can be seen in the live preview area 102 of FIG. 1. The control circuitry may receive an input indicating a command to move a first preview of the plurality of previews to a second portion of the display. As illustrated in FIG. 1, the control circuitry may receive a selection of a query (e.g., a carousel) and drag that carousel into area 104 or area 102 to assign the query to the query results display. The control circuitry may store the assignment (e.g., in storage 408) as a data structure. The data structure may be created for each query results display. It may include the following fields: name, assigned queries, and other suitable fields.

In some embodiments, the data structure includes a field specifying an order of results in each query of the query results display. The control circuitry may receive an input that includes an instruction to modify an order of results of a query of the assigned queries. As discussed in relation to FIG. 2, control circuitry 404 may generate for display (e.g., on display 412) a graphic user interface that includes a plurality of sliders (e.g., sliders of area 204 of FIG. 2). The control circuitry may receive (e.g., via user interface 320) a movement of a specific slider. The control circuitry may store a command associated with the movement of the slider in a field of the data structure corresponding to the query results display, as described above. When transmitting the queries of the query results display to a client device (e.g., via communications network 506), the control circuitry may include (e.g., in a field of a data structure) an instruction to the client device to modify the order of results of the query.

At 608, control circuitry 404 transmits the assignments of the selected queries and the queries to a client device, where the client device outputs, in the query results display, results of each of the assigned queries in an arrangement independently navigable from results of each of the other assigned queries. For example, the control circuitry may store the query results display in a data structure. As described above, the data structure may include a plurality of fields. The data structure may be transmitted to a client device. In some embodiments, the query results display can be created using a web interface of a client device (e.g., computer equipment 512). The query results display may be stored (e.g., at the computer equipment 512). In some embodiments, the query results display may be transmitted to a server (e.g., processing server 504) to be stored for later transmission to a client device for the end-user. When the client device receives the queries and the assignments (e.g., a data structure containing the queries and assignments, and in some embodiments, the order of results), the client device may process the data structure to generate for display the query results display.

Figure 7:
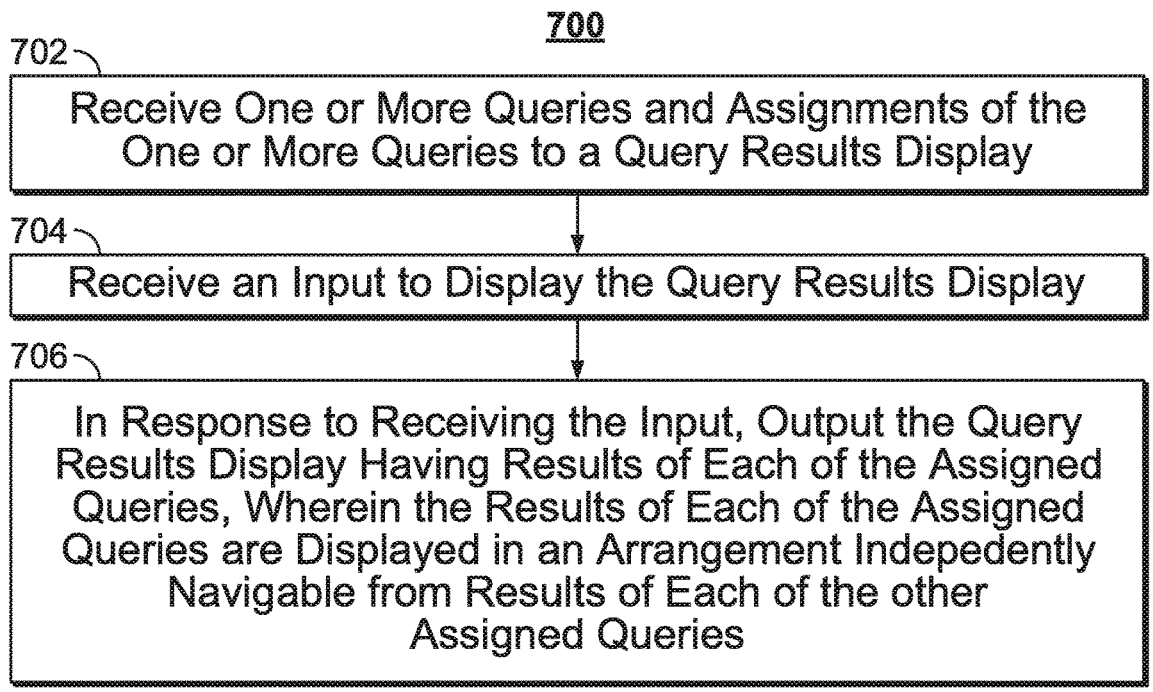
FIG. 7 is a flowchart of an illustrative process for generating a query results display, in accordance with some embodiments of the disclosure.

FIG. 7 is a flowchart of an illustrative process for generating a query results display, in accordance with some embodiments of the disclosure. At 702, control circuitry 404 (e.g., of a television equipment 508) receives one or more queries and assignments of the one or more queries to a query results display. For example, the control circuitry may receive the queries and the assignments from processing server 504. The queries and the assignments may be received as a query results display data structure.

At 704, control circuitry 404 (e.g., on a tablet, smartphone, or another suitable user television equipment) receives an input to display the query results display. For example, the control circuitry may receive a command (e.g., from a user) to display a screen (e.g., the query results display) for media consumption. The control circuitry may retrieve the query results display from storage 408. In some embodiments, the control circuitry may retrieve the queries and assignments in response to an input to display the query results display.

Figure 8:
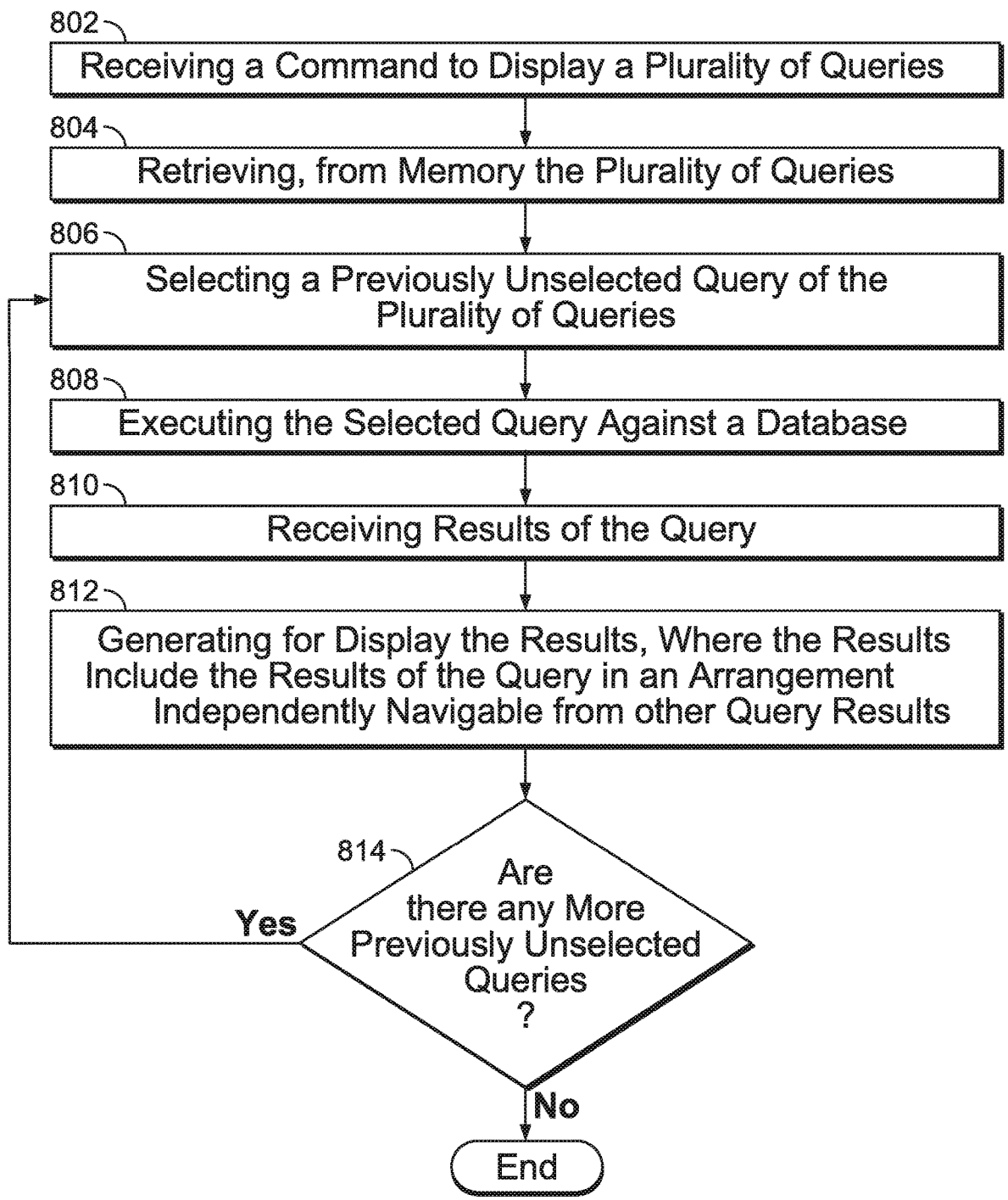
FIG. 8 is a flowchart of an illustrative process for generating for display a preview of a query results display or an output of a query results display, in accordance with some embodiments of the disclosure.

At 706, control circuitry 404, in response to receiving the input, outputs the query results display having results of each of the assigned queries, where the results of each of the assigned queries are displayed in an arrangement independently navigable from results of each of the other assigned queries. FIG. 8 is a flowchart of an illustrative process for generating for display a query results display. At 802, control circuitry 404 receives a command to display the plurality of queries (e.g., the query results display). For example, the control circuitry may be residing on a television equipment 508 and the command received may be an input (e.g., from a user) to generate for display a created query results display).

At 804, control circuitry 404 retrieves, from memory (e.g., from storage 408), the plurality of queries. For example, the control circuitry may retrieve from memory a data structure corresponding to a query results display. The data structure may include a plurality of queries that were assigned to the query results display. The control circuitry may iterate through each query in the data structure.

At 806, control circuitry 404 selects a previously unselected query of the plurality of queries. For example, the control circuitry may select one of the queries from the data structure corresponding to the query results display for processing. At 808, control circuitry 404 executes the selected query against a database. For example, control circuitry 404 may transmit the selected query to a remote server that has a database of media content listings. The database may be located at processing server 504 and/or media content source 502. The database server may execute the query against its database and transmit the results back to the client device from which the query was received.

At 810, control circuitry 404 receives the results of the query. For example, control circuitry 404 may receive the results of the query of communications network 506. In some embodiments, the database may be located in storage 408 of a client device. Thus, the control circuitry may execute the query against a local database. It should be noted that the local database would have a limited amount of program data (e.g., program data for a week or two weeks).

At 812, control circuitry 404 generates for display the received results. The received results are displayed in an arrangement independently navigable from other query results. For example, as illustrated in FIG. 3, each strip (e.g., Watch Now 310 or Recommended for You 312) can be navigated independently from the other strip. That is, the system may receive input to navigate through Watch Now 301, and when the last result is reached in this strip, the control circuitry may navigate to the first result, upon input to navigate forward. The control circuitry may respond in the same manner when navigating through a preview display (e.g., a preview of FIG. 1 or FIG. 2. Control circuitry 404 may receive an input to scroll through a first preview of the plurality of previews. The control circuitry, before executing the command, may determine if the input instructs scrolling past the last results (e.g., the last result is now highlighted or selected). In response to determining that the input instructs scrolling past a last result of the preview, control circuitry 404 may scroll past a last result to a first result of the preview.

At 814, control circuitry 404 determine whether there are any more previously unselected queries. If there are more previously unselected queries, process 800 moves to 806, where the next previously unselected query is selected. If there are no more previously unselected queries, process 800 ends.

Figure 9:
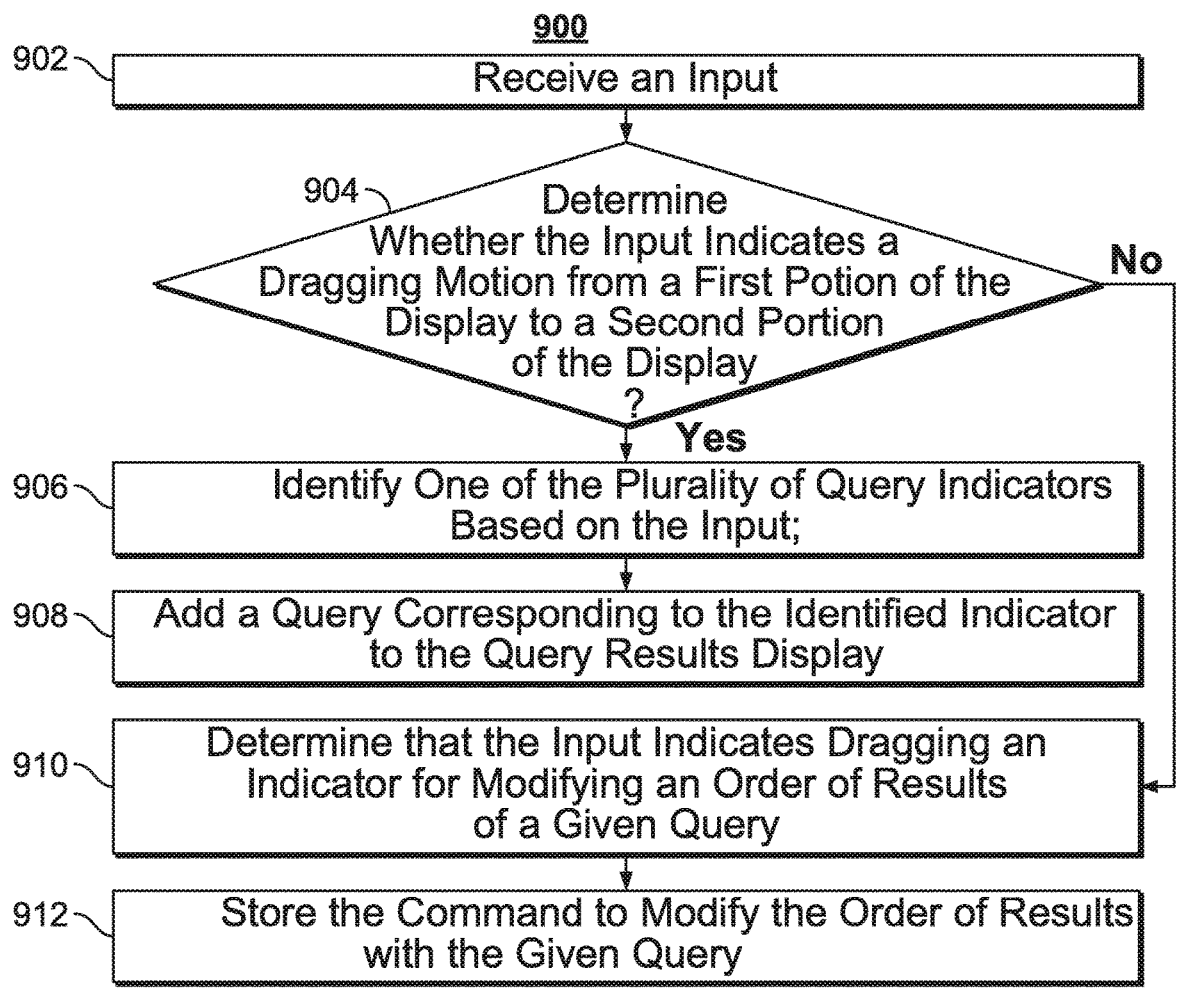
FIG. 9 is a flowchart of an illustrative process for adding a query to a query results display, in accordance with some embodiments of the disclosure.

FIG. 9 is a flowchart of an illustrative process for adding a query to a query results display. At 902, control circuitry 404 receives an input. The control circuitry may receive the input from a user input interface 410 or a user input interface 420, depending on a type of client device. At 904, control circuitry 404 determines whether the input indicates a dragging motion from a first portion of the display to a second portion of the display. For example, as illustrated in FIG. 1, a dragging motion may be received from area 106 into area 104. In some embodiments, a dragging motion may be received from area 106 to area 102.

If control circuitry 404 determines that the dragging motion is from a first portion of the display to a second portion of the display, process 900 moves to 906. At 906, control circuitry 404 identifies one of the plurality of query indicators based on the input. For example, the control circuitry may determine that a dragging motion originated at a location of the screen corresponding to a query 128 called "Carousel 1" in FIG. 1. The control circuitry may, upon detection of the identifier corresponding to the query, retrieve the query or in some embodiments a query identified associated with the dragged query. At 908, control circuitry 404 adds the query corresponding to the identifier indicator to the query results display. For example, the control circuitry may add the query identifier to area 104 and add a strip to the live preview area 102.

In order to add a preview to live preview area 102, the control circuitry may transmit the query to a remote server hosting a database that executes queries (e.g., processing server 504 or media content source 502). The control circuitry may receive the query results from the server and may display the results of the query in the live preview area 102.

If control circuitry 404 determines that the input indicates a dragging motion from the first portion of the display to the second portion of the display, control circuitry 404 may determine if there is a different dragging motion. At 910, control circuitry 404 determines that the input indicates dragging an indicator for modifying an order of results of a given query. For example, the control circuitry may generate for display screen 200 of FIG. 2. Screen 200 may include area 204 for modifying an order of media assets in the query results display. The control circuitry may determine that the user selected a slider and is dragging the slider to a new location. The control circuitry may compare the dragging motion to a table of dragging motions that identify a command for the specific dragging motion. At 912, control circuitry 404 stores the command to modify the order of results with the given query. In some embodiments, the control circuitry may modify the preview for the query in the live preview area 210 as indicated by a change between screen 200 and screen 220.

Figure 10:
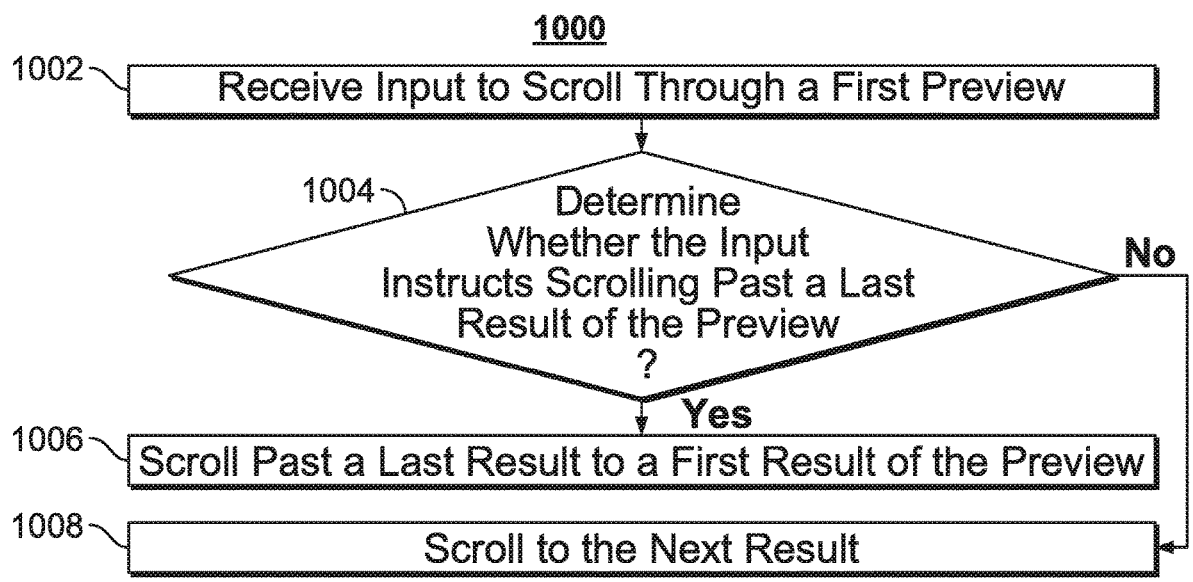
FIG. 10 is a flowchart of an illustrative process for responding to a scroll past the last results in a list of results, in accordance with some embodiments of the disclosure.

FIG. 10 is a flowchart of an illustrative process for responding to a scroll past the last results in a list of results. At 1002, control circuitry 404 receives input to scroll through a first preview. For example, the control circuitry may receive the input through user input interface 410 or user input interface 420 depending on the type of client device. At 1004, control circuitry 404 determines whether the input instructs scrolling past the last results of the preview. For example, the control circuitry may identify a media asset identifier that was highlighted or selected prior to the input and determine the next media asset identifier in the sequence. If control circuitry 404 determines that the input does not instruct scrolling past the last results in the preview, process 1000 moves to 1008, where control circuitry 404 scrolls to the next result. If control circuitry 404 determines that the input instructs scrolling past the last result in the preview, process 1000 moves to 1006, where control circuitry 404 scrolls past the last result to a first result in the preview.

In some embodiments, the control circuitry may perform the following actions when modifying the order of results in either a preview (e.g., in a live preview area 102 or during query results display presentation to a user). The control circuitry may generate for display a plurality of updatable indicators (e.g., sliders). Each indicator (e.g., slider) may correspond to a given way to modify the order of results of the query of the assigned queries. For example, the order may be modified based on recency, popularity, personalized movies, ratings, personalized series, or another suitable order. Control circuitry 404 may receive an update of an indicator of the plurality of updatable indicators, where the update indicates an instruction to modify the order of results of the query of the assigned queries. For example, the control circuitry may receive a change in the recency indicator. Based on the update, the control circuitry may store the query with a modification of the order of search results corresponding to the update. For example, the control circuitry may store in a data structure corresponding to the query results display the query and the corresponding order modification for the query. The control circuitry may transmit the modification to the client device.

In some embodiments control circuitry 404 may create a query using the following actions. The control circuitry may receive criteria for a query, where the criteria includes input into one or more fields. For example, FIG. 2 illustrates input of such criteria. The control circuitry may generate a query of the plurality of queries based on the criteria. For example, the control circuitry may generate a carousel as the query. The control circuitry may generate for display a selectable preview of results of the query. For example, preview area 210 of FIG. 2 and live preview area 102 may be generated for display with preview strips (i.e., preview of results). The control circuitry may receive a selection of the selectable preview, and, based on receiving the selection, add the query to the query results display. For example, FIG. 1 illustrates a selectable preview in preview area 102 that may be selected and dragged to area 104 in order to add the corresponding query to the query results display. It should be noted that carousel 128 may be selected in area 106 to show a preview of the carousel in the live preview which can be selectable. The control circuitry may receive the selection and the command in order to add the query to the query results display.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for generating a query results display, the method comprising:
   receiving, from a first device, a plurality of queries at a remote server through a communication network;
   storing, in memory, each query of the plurality of queries;
   assigning, at the remote server, a respective navigable arrangement of results of each query of the plurality of queries to a respective display area of a plurality of display areas of the query results display;
   generating, for display on the first device, a plurality of previews at the plurality of display areas of the query results display, the plurality of previews corresponding to the assigned navigable arrangements of results of the plurality of queries, wherein each respective preview comprises an arrangement of the results of a corresponding query of the plurality of queries that is independently navigable from results of each of other queries of the plurality of queries;
   receiving, from the first device, an input that includes an instruction to modify an order of results of a first query of the plurality of queries;

generating, for display on the first device, an updated preview at a first display area of the plurality of display areas corresponding to the assigned navigable arrangement of results of the first query, wherein the updated preview comprises the navigable arrangement of results of the first query having the results of the first query ordered according to the input; and transmitting, from the remote server to the first device through the communication network, the assignments of the navigable arrangements of the results of the plurality of queries to the plurality of display areas of the query results display, wherein the query results display comprises the updated preview at the first display area of the plurality of display areas of the query results display.

2. The method of claim 1, wherein the assigning, at the remote server, a respective navigable arrangement of results of each query of the plurality of queries to the plurality of display areas of the query results display further comprises:

receiving an input at the remote server comprising an instruction to move a first preview of the plurality of previews to a second display area of the query results display; and based on the input, assigning the arrangement of results of the query associated with the first preview to the second display area of the query results display.

3. The method of claim 1, further comprising:

generating a plurality of updatable indicators, wherein each indicator corresponds to an option for modifying the order of results of the first query of the plurality of queries;

receiving an update of a first indicator of the plurality of updatable indicators at the remote server, wherein the update indicates the instruction to modify the order of results of the first query of the plurality of queries, and wherein the first indicator corresponds to a first option for modifying the order of results based on the instruction;

based on the update, storing the first query with a modification of the order of results corresponding to the update; and transmitting the modification to the first device.

4. The method of claim 1, further comprising:

receiving an input to scroll through a first preview of the plurality of previews; and in response to determining that the input instructs scrolling past a last result of the first preview, scrolling past the last result to a first result of the first preview.

5. The method of claim 1, further comprising:

receiving criteria for a query, wherein the criteria comprise input into one or more fields;

generating a query of the plurality of queries based on the criteria;

generating for display a selectable preview of results of the query;

receiving a selection of the selectable preview; and based on receiving the selection, adding the query to the query results display.

6. The method of claim 5, wherein the generating for display the selectable preview of results of the query comprises:

transmitting the query to a serverfor querying a database at the server; and receiving, from the server, the results of the query based on querying the database.

7. The method of claim 1, wherein the assigning, at the remote server, the respective navigable arrangement of results of each query of the plurality of queries to the respective display area of the plurality of display areas of the query results display comprises:

retrieving, for each of the plurality of queries, a plurality of results;

extracting, for each of the plurality of results, a characteristic, wherein the characteristic indicates at least one of a popularity of a result or a recency of a result;

generating, based on the characteristic, an instruction, wherein the instruction comprises an order for the plurality of results for each of the plurality of queries and an arrangement of the plurality of results for each query of the plurality of queries corresponding to the plurality of display areas of the query results display; and storing, in memory, the instruction for the plurality of queries.

8. A method for generating a query results display, the method comprising:

receiving one or more queries from a client device and assignments of one or more navigable arrangements of results of the one or more queries to display areas of a query results display from a remote server, wherein the assignments of the one or more navigable arrangements of results of the one or more queries to the display areas of the query results display are assigned at the remote server;

outputting, for display at the client device, a plurality of previews at the display areas of the query results display, the plurality of previews corresponding to the one or more navigable arrangements of results of the one or more queries, wherein each respective preview comprises an arrangement of the results of a corresponding query of the one or more queries that is independently navigable from results of each of other queries of the one or more queries;

receiving a first input at the client device that includes an instruction to modify an order of results of a first query of the one or more queries;

outputting, for display at the client device, an updated preview at a first display area of the display areas corresponding to the one or more navigable arrangement of results of the first query, wherein the updated preview comprises the navigable arrangement of results of the first query having the results of the first query ordered according to the first input;

receiving a second input at the client device to display the query results display; and in response to receiving the second input, outputting the query results display transmitted through a communication network to the client device having the navigable arrangement of the results of each of the one or more queries, wherein the query results display comprises the updated preview at the first display area of the display areas of the query results display.

9. The method of claim 8, further comprising:

receiving an input to scroll through an arrangement of the results of the one or more queries; and in response to determining that the input instructs scrolling past a last result of the arrangement, scrolling past the last result to a first result of the arrangement.

10. The method of claim 8, further comprising:

transmitting, to a server, each query having a navigable arrangement of results assigned to the query results display for querying a database at the server; and receiving, from the server, the results of each query having the navigable arrangement of results assigned to the query results display.

11. The method of claim 8, wherein the assignments of the one or more navigable arrangements of results of the one or more queries to the display areas of the query results display are assigned at the remote server by:
retrieving, for each of the one or more queries, a plurality of results;
extracting, for each of the plurality of results, a characteristic, wherein the characteristic indicates at least one of a popularity of a result or a recency of a result;
generating, based on the characteristic, an instruction, wherein the instruction comprises an order for the plurality of results for each of the one or more queries and an arrangement of the plurality of results for each query of the one or more queries corresponding to the display areas of the query results display; and
storing, in memory, the instruction for the one or more queries.

12. A system for generating a query results display, the system comprising:
memory; and
control circuitry configured to:
receive, from a first device, a plurality of queries at a remote server through a communication network;
store, in the memory, each query of the plurality of queries;
assign, at the remote server, a respective navigable arrangement of results of each query of the plurality of queries to a respective display area of a plurality of display areas of the query results display;
generate, for display on the first device, a plurality of previews at the plurality of display areas of the query results display, the plurality of previews corresponding to the assigned navigable arrangements of results of the plurality of queries, wherein each respective preview comprises an arrangement of the results of a corresponding query of the plurality of queries that is independently navigable from results of each of other queries of the plurality of queries;
receive, from the first device, an input that includes an instruction to modify an order of results of a first query of the plurality of queries;
generate, for display on the first device, an updated preview at a first display area of the plurality of display areas corresponding to the assigned navigable arrangement of results of the first query, wherein the updated preview comprises the navigable arrangement of results of the first query having the results of the first query ordered according to the input; and
transmit, from the remote server to the first device through the communication network, the assignments of the navigable arrangements of the results of the plurality of queries to the plurality of display areas of the query results display, wherein the query results display comprises the updated preview at the first display area of the plurality of display areas of the query results display.

13. The system of claim 12, wherein the control circuitry is further configured, when assigning, at the remote server, a respective navigable arrangement of results of each query of the plurality of queries to the plurality of display areas of the query results display, to:
receive an input at the remote server comprising an instruction to move a first preview of the plurality of previews to a second display area of the query results display; and
based on the input, assign the arrangement of results of the query associated with the first preview to the second display area of the query results display.

14. The system of claim 12, wherein the control circuitry is further configured to:
generate a plurality of updatable indicators, wherein each indicator corresponds to an option for modifying the order of results of the first query of the plurality of queries;
receive an update of a first indicator of the plurality of updatable indicators at the remote server, wherein the update indicates an instruction to modify the order of results of the first query of the plurality of queries, and wherein the first indicator corresponds to a first option for modifying the order of results based on the instruction;
based on the update, store the first query with a modification of the order of results corresponding to the update; and
transmit the modification to the first device.

15. The system of claim 12, wherein the control circuitry is further configured to:
receive an input to scroll through a first preview of the plurality of previews; and
in response to determining that the input instructs scrolling past a last result of the first preview, scroll past the last result to a first result of the first preview.

16. The system of claim 12, wherein the control circuitry is further configured to:
receive criteria for a query, wherein the criteria comprise input into one or more fields;
generate a query of the plurality of queries based on the criteria;
generate for display a selectable preview of results of the query;
receive a selection of the selectable preview; and
based on receiving the selection, add the query to the query results display.

17. The system of claim 16, wherein the control circuitry is further configured, when generating for display the selectable preview of results of the query, to:
transmit the query to a server for querying a database at the server; and
receive, from the server, the results of the query based on querying the database.

18. The system of claim 12, wherein the control circuitry configured to assign, at the remote server, the respective navigable arrangement of results of each query of the plurality of queries to the respective display area of the plurality of display areas of the query results display is configured to:
retrieve, for each of the plurality of queries, a plurality of results;
extract, for each of the plurality of results, a characteristic, wherein the characteristic indicates at least one of a popularity of a result or a recency of a result;
generate, based on the characteristic, an instruction, wherein the instruction comprises an order for the plurality of results for each of the plurality of queries and an arrangement of the plurality of results for each query of the plurality of queries corresponding to the plurality of display areas of the query results display; and store, in memory, the instruction for the plurality of queries.

19. A system for generating a query results display, the system comprising:
communications circuitry; and
control circuitry configured to:
receive, using the communications circuitry, one or more queries from a client device and assignments of one or more navigable arrangements of results of the one or more queries to display areas of a query results display from a remote server, wherein the assignments of the one or more navigable arrangements of results of the one or more queries to the display areas of the query results display are assigned at the remote server;
output, for display at the client device, a plurality of previews at the display areas of the query results display, the plurality of previews corresponding to the one or more navigable arrangements of results of the one or more queries, wherein each respective preview comprises an arrangement of the results of a corresponding query of the one or more queries that is independently navigable from results of each of other queries of the one or more queries;
receive a first input at the client device that includes an instruction to modify an order of results of a first query of the one or more queries;
output, for display at the client device, an updated preview at a first display area of the display areas corresponding to the one or more navigable arrangement of results of the first query, wherein the updated preview comprises the navigable arrangement of results of the first query having the results of the first query ordered according to the first input;
receive a second input at the client device to display the query results display; and
in response to receiving the second input, output the query results display from the remote server transmitted through a communication network to the client device having the navigable arrangement of the results of each of the one or more queries, wherein the query results display comprises the updated preview at the first display area of the display areas of the query results display.

20. The system of claim 19, where the control circuitry is further configured to:
receive an input to scroll through an arrangement of the results of the one or more queries; and
in response to determining that the input instructs scrolling past a last result of the arrangement, scroll past the last result to a first result of the arrangement.

21. The system of claim 19, wherein the control circuitry is further configured to:
transmit, to a server, each query having a navigable arrangement of results assigned to the query results display for querying a database at the server; and
receive, from the server, the results of each query having the navigable arrangement of results assigned to the query results display.

22. The system of claim 19, wherein the control circuitry configured to assign, at the remote server, the one or more navigable arrangements of results of the one or more queries to the display areas of the query results display is configured to:
retrieve, for each of the one or more queries, a plurality of results;
extract, for each of the plurality of results, a characteristic, wherein the characteristic indicates at least one of a popularity of a result or a recency of a result;
generate, based on the characteristic, an instruction, wherein the instruction comprises an order for the plurality of results for each of the one or more queries and an arrangement of the plurality of results for each query of the one or more queries corresponding to the display areas of the query results display; and
store, in memory, the instruction for the one or more queries.

* * * * *